No. 773,480. PATENTED OCT. 25, 1904.
F. W. DARNSTAEDT.
AUTOMOBILE FRAME.
APPLICATION FILED MAY 2, 1903.
NO MODEL.
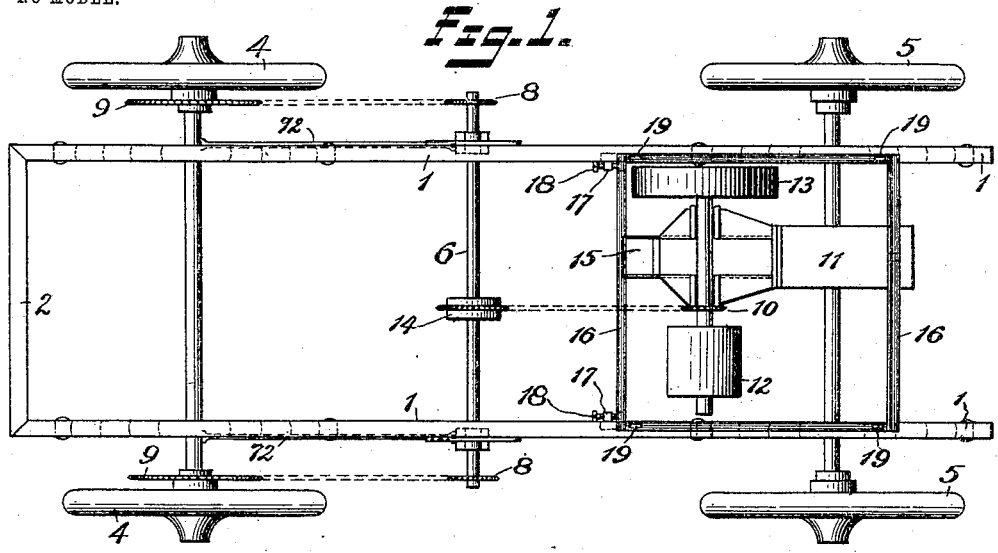
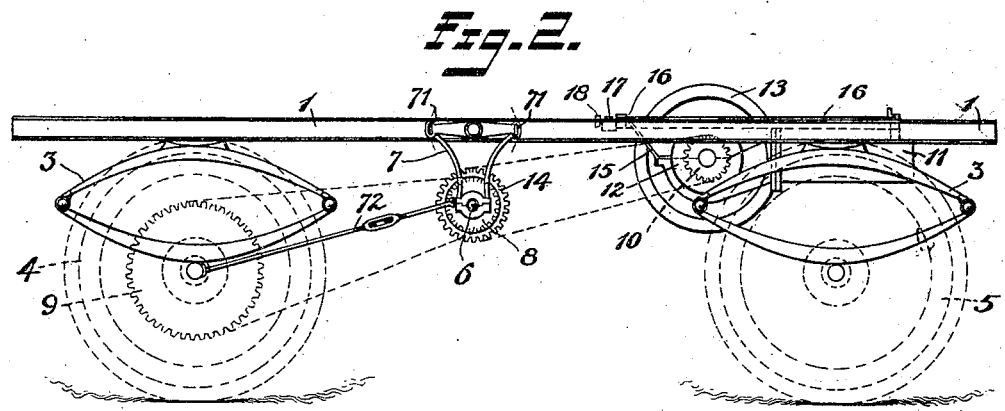
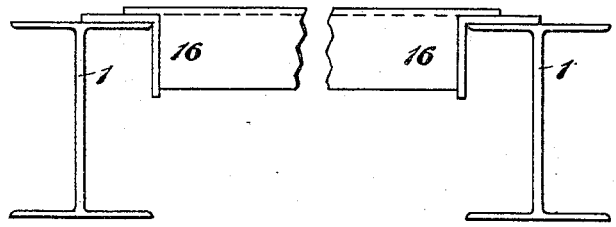
WITNESSES:
INVENTOR
Frederick W. Darnstaedt
BY
ATTORNEY No. 773,480. Patented October 25, 1904.

UNITED STATES PATENT OFFICE.

FREDERICK W. DARNSTAEDT, OF NEW BRITAIN, CONNECTICUT, ASSIGNOR, BY MESNE ASSIGNMENTS, TO CORBIN MOTOR VEHICLE CORPORATION, OF NEW BRITAIN, CONNECTICUT, A CORPORATION OF CONNECTICUT.

AUTOMOBILE-FRAME.

SPECIFICATION forming part of Letters Patent No. 773,480, dated October 25, 1904.

Application filed May 2, 1903. Serial No. 155,296. (No model.)

*To all whom it may concern:*

Be it known that I, FREDERICK W. DARNSTAEDT, a citizen of the United States, residing at New Britain, in the county of Hartford, State of Connecticut, have invented certain new and useful Improvements in Automobile-Frames, of which the following is a full, clear, and exact description.

My invention relates to improvements in automobiles, particularly to the chassis.

Among the main objects of my invention are to provide a new and improved construction and arrangement whereby the motor is adjustably and removably carried by the main body. This construction is such that the parallelism or alinement of the motor is correctly preserved at all times irrespective of its adjustment. Should the motor be removed for any purpose, it cannot be replaced excepting in its correct position. The construction also provides an adjustment for the driving chain or shaft.

In the accompanying drawings, Figure 1 is a conventional plan view of a motor-carriage chassis constructed to embody my invention. Fig. 2 is a side elevation thereof. Fig. 3 is a relatively enlarged diagrammatic view of certain structural details, the middle portion being broken away.

The main frame may be composed of side bars 1 1, which may be of I-beams, channel-iron, or the like. These side bars may be connected at the end or ends as desired—for example, as at 2. Springs 3 3 may be secured to the side bars 1 1 of the frame and may carry the axles and wheels. The rear wheels 4 4 may be the driving-wheels and the front wheels 5 5 the steering-wheels.

In the particular form shown 6 is a counter-shaft carried by adjustable hanging brackets 7 7. These brackets may be pivotally mounted on the side bars 1 1 of the main frame and may have laterally-extending arms having slots 71 71 in their extremities, through which may pass bolts (not shown) by which the bracket may be set at any desired adjustment.

72 72 are reach-rods leading from the rear axle to the lower parts of the brackets 7. These reach-rods may be fitted with the usual turnbuckles, whereby said rods may be lengthened or shortened, as desired.

8 8 are sprocket-wheels carried by the shaft 6.

9 9 are sprockets on the driving-wheels, and chains may be provided to connect the sprockets 8 and 9 on each side of the vehicle.

The counter-shaft 6 may split and have a differential 14 and the sprocket arranged thereon, which latter may be connected by a chain with the sprocket 10, driven by the motor 11. Mechanically located between the motor 11 and the sprocket 10 may be a variable transmission 12.

13 represents a fly-wheel.

15 is a bracket or extension of the motor-frame, which is connected to a supplemental motor-supporting frame 16. The supplemental frame 16 may include side bars and end bars suitably connected together and preferably made of angle-iron, the upper flanges of which at the sides extending outward, so as to be supported upon the side bars 1 1 of the main frame. The side bars of both the main and supplemental frames are preferably arranged in parallelism and fit snugly together, as best seen in Fig. 3.

The side bars of one of the frames may be provided with lugs 17 17, carrying adjusting-screws 18 18, taking up against a portion of the other frame and by which the position of the supplemental frame 16 may be longitudinally adjusted. Slots 19 19 may be provided in the supplemental frame 16 or the side bars 1 of the main frame, through which slots bolts (not shown) may pass and by which the supplemental frame may be securely clamped on the main frame when the desired adjustment has been attained.

From the foregoing it will be seen that the motor and the associated parts may all be carried by the supplemental frame 16, any suitable number of connections between said parts and the supplemental frame being permissible. The supplemental frame is so associated with the main frame that it is not only adjustable relatively to the length thereof, but it is also detachable, it being merely necessary to loosen the various connections and remove said frame. It should be understood that the motor 11 and its associated parts are merely conventionally illustrated.

If it is desirable at any time to get access to all parts of the motor to repair or adjust the same, this may be readily done by removing the frame 16, whereupon the necessary work may be done away from the wagon. The construction affords a convenient adjustment for the driving mechanism in that the chains leading from the sprockets 8 to 10 may be taken up by varying the position of the bracket 7, while the chain leading from the motor-sprocket 10 to the differential 14 may be varied by shifting the supplemental frame.

Obviously the chain-drive from the motor to the counter-shaft or the driving-shaft is not essential to those features of my improvement involving the construction and arrangement of the supplemental motor-supporting frame.

What I claim is—

1. In an automobile-chassis, a main frame, a supplemental motor-carrying frame carried thereby, a motor thereon, adjusting means therefor, a counter-shaft, means for transmitting power to said counter-shaft from said motor, separate means to transmit power from said counter-shaft to the driving-wheels, and an adjustable support for said counter-shaft, and means to hold said support against swinging movement.

2. In an automobile-chassis, a main frame, a supplemental motor-carrying frame carried thereby, a motor on said frame, adjusting means for said frame, a counter-shaft, means for transmitting power to said counter-shaft from said motor, separate means for transmitting power from said counter-shaft to the driving-wheels, and an adjustable support for said counter-shaft comprising brackets hinged to the main frame and locking devices to hold said brackets in any desired position and against swinging movement.

Signed at New Britain, Connecticut, this 28th day of April, 1903.

FREDERICK W. DARNSTAEDT.

Witnesses:
M. S. WIARD,
C. E. RUSSELL.